United States Patent
Rausch et al.

(10) Patent No.: US 10,554,236 B1
(45) Date of Patent: Feb. 4, 2020

(54) MITIGATING INTERFERENCE RELATED TO WIRELESS NETWORK SIGNALS

(71) Applicant: Sprint Communications Company L.P., Overland Park, KS (US)

(72) Inventors: Walter F. Rausch, Olathe, KS (US); Harry William Perlow, Palm Harbor, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/184,590

(22) Filed: Nov. 8, 2018

(51) Int. Cl.
| | |
|---|---|
| *H04M 1/00* | (2006.01) |
| *H04B 1/3805* | (2015.01) |
| *H04W 24/04* | (2009.01) |
| *H04W 24/08* | (2009.01) |
| *H04B 1/40* | (2015.01) |

(52) U.S. Cl.
CPC ............ *H04B 1/3805* (2013.01); *H04B 1/40* (2013.01); *H04W 24/04* (2013.01); *H04W 24/08* (2013.01)

(58) Field of Classification Search
CPC ....... H04B 1/3805; H04B 1/40; H04W 24/04; H04W 24/08
USPC ....................................................... 455/575.5
See application file for complete search history.

(56) References Cited

U.S. PATENT DOCUMENTS

| | | | |
|---|---|---|---|
| 2017/0195887 A1* | 7/2017 | Jovancevic | ........... H04W 16/14 |
| 2017/0311171 A1* | 10/2017 | Kurian | .................. H04W 16/14 |
| 2018/0199342 A1* | 7/2018 | Rai | ........................ G01S 7/021 |

* cited by examiner

*Primary Examiner* — Huy C Ho (57) ABSTRACT

Mitigation of interference between wireless network signals and signals emitted from sources external to the wireless network are disclosed. The wireless network signals may include out-of-band emissions that create interference with the signals emitted from the external source. To mitigate the interference, an antenna is provided with sensors configured to detect when a signal is directed at the antenna from the external source. A controller is configured to activate/deactivate signal transmission from the antenna based on feedback from the sensors in order to mitigate interference with the signal emitted from the external source. The sensors may be configured to detect radar emissions or other types of signal emissions.

20 Claims, 10 Drawing Sheets

MITIGATING INTERFERENCE RELATED TO WIRELESS NETWORK SIGNALS

TECHNICAL FIELD

The field relates to wireless networks and operation thereof, and in particular, to mitigating interference between wireless network signals and signals emitted from sources external to the wireless network.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, methods, systems, and devices for mitigating interference between wireless network signals and signals emitted from sources external to the wireless network. The external signal may be a radar emission from a radar installation, or another type of emitted signal.

In one embodiment, a broadcast cell operating in a wireless network includes an antenna that transmits and receives signals over the wireless network. The antenna may include a plurality of signal transmitting and receiving components, each of which may be connected to a radio. The signal transmitting and receiving components may be configured to transmit and receive signals over a selected frequency band/range associated with the wireless network. The antenna may be configured with one or more sensors, also referred to herein as signal detectors, that are configured to detect when a signal is directed towards the antenna that may potentially cause and/or encounter interference. The sensors may be positioned on, about, and/or otherwise integrated with the antenna, so that they can detect when a particular signal emission associated with interference is directed at the antenna. The sensors may also be configured to provide feedback to a controller. The controller may be configured to activate/deactivate signal transmission from the antenna based on the sensors detecting the signal associated with the interference. This increased control of signal transmission, as well as detection and mitigation of signal interference, can improve network performance, reduce interference with sources external to the wireless network, and/or protect signal processing equipment from exposure to potential damaging signal inputs, among other benefits.

In one embodiment of the present technology, a system for mitigating interference between wireless network signals and radar emissions is provided. The system comprises an antenna comprising a plurality of transmitting and receiving components, each one of the plurality of transmitting and receiving components adapted to transmit and receive a wireless network signal, a first sensor coupled to a first side of the antenna, the first sensor configured to detect a radar emission, a second sensor coupled to a second side of the antenna, the second sensor configured to detect the radar emission, and a controller communicatively coupled to the first sensor, the second sensor, and the antenna. The controller is configured to deactivate signal transmission from the plurality of transmitting and receiving components when at least one of the first sensor and the second sensor detects the radar emission, and reactivate signal transmission from the plurality of transmitting and receiving components when the first sensor and the second sensor do not detect the radar emission.

In another embodiment of the present technology, a method for mitigating interference between wireless network signals and radar emissions is provided. The method comprises transmitting a wireless signal from an antenna. The antenna comprises a plurality of transmitting and receiving components, a first sensor coupled to a first side of the antenna and configured to detect a radar emission, and a second sensor coupled to a second side of the antenna and configured to detect the radar emission. The method further comprises detecting the radar emission with the first sensor, deactivating signal transmission from the plurality of transmitting and receiving components following detection of the radar emission by the first sensor, detecting the radar emission with the second sensor, and reactivating the signal transmission from the plurality of transmitting and receiving components after the first sensor and the second sensor no longer detect the radar emission.

In another embodiment of the present technology, a method of configuring an antenna comprising a plurality of transmitting and receiving components to mitigate interference between the antenna and a radar installation is provided. The method comprises attaching a first sensor configured to detect a radar emission to a first side of the antenna, attaching a second sensor configured to detect the radar emission to a second side of the antenna, and communicatively coupling a controller to the first sensor, the second sensor, and the plurality of transmitting and receiving components. The controller is configured to deactivate signal transmission from the plurality of transmitting and receiving components when at least one of the first sensor and the second sensor detects the radar emission, and reactivate signal transmission from the plurality of transmitting and receiving components when the first sensor and the second sensor do not detect the radar emission.

The term "antenna" as used herein may comprise any one or a combination of components, including software and/or hardware, in localized and/or distributed configurations, that can be collectively utilized to broadcast a signal over a wireless communications network, and is not limited to any one component or combination of components.

BRIEF DESCRIPTION OF THE DRAWINGS

The present technology is described in detail herein with reference to the attached drawing figures, which are intended to provide exemplary and non-limiting examples of the disclosed subject matter, wherein.

DETAILED DESCRIPTION

The subject matter of the present technology is described herein to meet statutory requirements. However, the description is not intended to limit the scope of the invention. Rather, the claimed subject matter may be embodied in other ways, to include different steps, combinations of steps, features, and/or combinations of features, similar to those described herein, and in conjunction with other present or future technologies. Moreover, although the terms "step" and/or "block" may be used to identify different elements of methods employed, the terms should not be interpreted as implying any particular order among or between various steps or blocks unless and except when the order of individual steps or blocks is explicitly described and required.

At a high level, the subject matter of this disclosure relates to systems, methods, and devices/apparatuses/assemblies for detecting interference between wireless network signals and signals emitted from sources external to the wireless network, and mitigating the same. In one example aspect, the signal interference is caused by a radar emission transmitted from a radar installation operating in proximity to the wireless network. To mitigate the potential interference, the broadcast cells operating in the wireless network may be adapted to detect the interfering signals and control signal transmission based on the detected signals to reduce the incidence of interference. Embodiments that achieve such signal detection and interference mitigation are described further below with reference to FIGS. 1-13.

Out-of-Band Emissions and Associated Signal Interference

Wireless network signals emitted from a broadcast cell often include out-of-band emissions. Out-of-band emissions are signal emissions that fall outside of a designated frequency range used by the broadcast cell to communicate over the wireless network. The continued implementation of Full Dimension or Massive Multiple-Input Multiple-Output antenna configurations ("FD MIMO" or "Massive MIMO"), which utilize antenna arrays having numerous transmitting and receiving components arranged in relatively dense or compact configurations, may increase the incidence of out-of-band emissions. The compact design of FD MIMO and/or Massive MIMO signal transmission equipment may increase wireless network performance and throughput compared to systems having lower density configurations of components, but may also reduce the ability to control out-of-band emissions due to the limitations of signal processing (e.g., digital signal processing or other signal modification techniques) and/or due to the size constraints presented by such compact arrangements of components that limit the ability to incorporate signal filters of sufficient capability to control the out-of-band emissions.

The embodiments disclosed herein related to the detection and mitigation of signal interference may be embodied as, among other things, methods, systems, and/or computer-program products. Accordingly, the present technology may take the form of a hardware embodiment, a software embodiment, or an embodiment combining software and hardware, and may also take the form of a computer-program product that includes computer-useable instructions embodied on one or more computer-readable media. The technology described herein may further be implemented as hard-coded into the mechanical design of wireless network components and/or equipment and/or may be built into a broadcast cell, antennas, and/or other local or distributed signal transmission components.

Computer-readable media may include volatile media, non-volatile media, removable media, and non-removable media, and may also include media readable by a database, a switch, and/or various other network devices. Network switches, routers, and related components are conventional in nature, as are methods of communicating using the same, and thus, further elaboration is not provided here. By way of example, and not limitation, computer-readable media may comprise computer storage media and/or non-transitory communications media. Communications media does not include signals per se.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Figure 1:
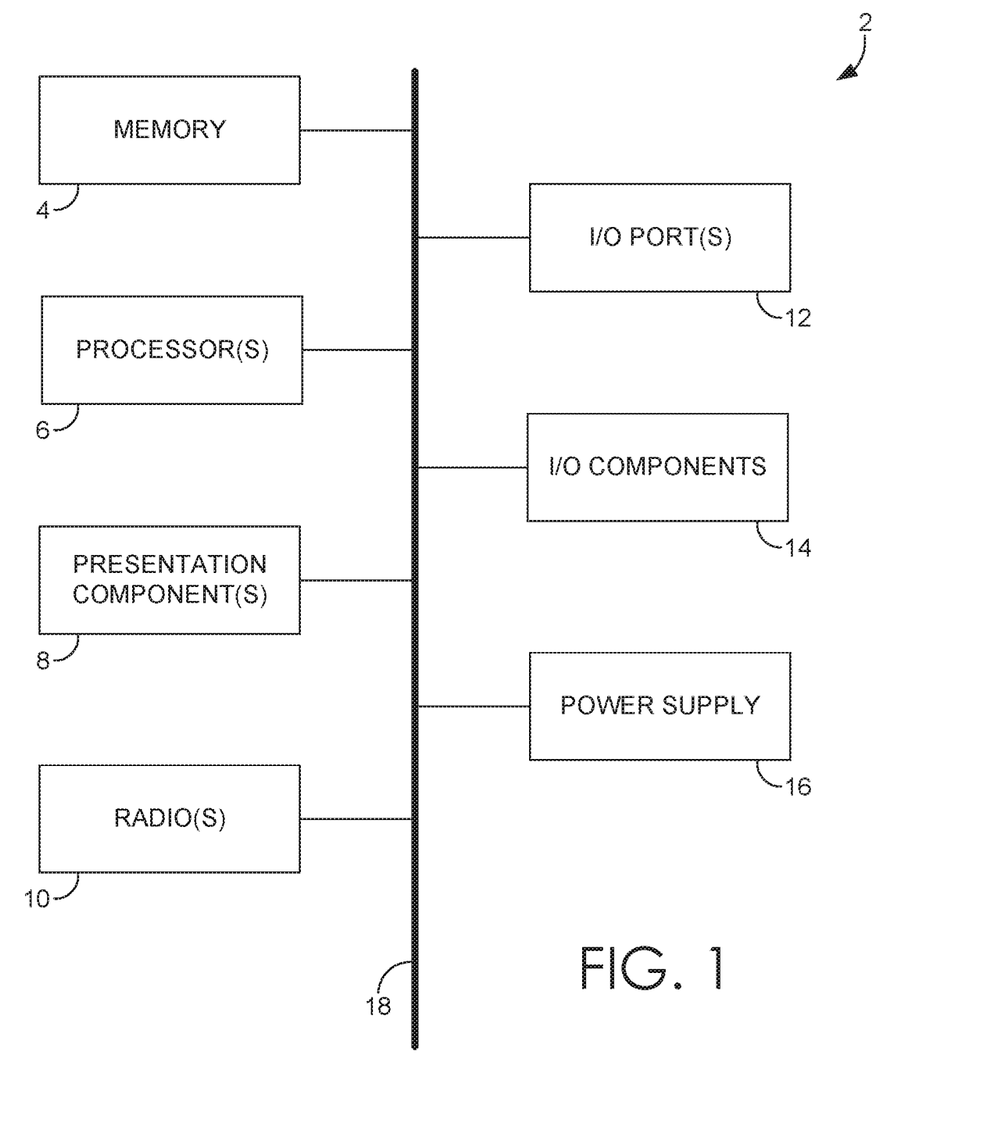
FIG. 1 depicts an example computing device suitable for implementing embodiments of the present technology.

Turning now to FIG. 1, a block diagram of an example computing device 2 suitable for implementing embodiments of the present technology is provided. It should be noted that although some components depicted in FIG. 1 are shown in the singular, they may be plural, and the components may be connected in a different, including distributed, configuration. For example, computing device 2 might include multiple processors and/or multiple radios. Referring to FIG. 1, computing device 2 includes a bus 18 that may directly or indirectly connect different components together, including memory 4, processor(s) 6, presentation component(s) 8 (if applicable), radio(s) 10, input/output (I/O) port(s) 12, input/output (I/O) component(s) 14, and power supply 16.

Memory 4 may take the form of the memory components described herein, and thus, further elaboration will not be provided here. Memory 4 may include any type of tangible medium that is capable of storing information, such as a database. A database may include any collection of records, data, and/or other information. In one aspect, memory 4 may include a set of computer-executable instructions that, when executed, facilitate various functions or steps disclosed herein. These instructions may be referred to herein as "instructions" or an "application" for short. Processor 6 may actually be multiple processors that may receive instructions and process them accordingly. Presentation component 8 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or even a lighted keyboard).

Radio 10 may facilitate communication with a network, and may additionally or alternatively facilitate other types of wireless communications, such as Wi-Fi, WiMAX, LTE, Bluetooth, and/or VoIP communications. In various aspects, the radio 10 may be configured to support multiple technologies, and/or multiple radios may be configured and utilized to support multiple technologies.

Input/output (I/O) ports 12 may take a variety of forms. Exemplary I/O ports may include a USB jack, a stereo jack, an infrared port, and/or other proprietary communication ports. Input/output (I/O) component 14 may also comprise one or more keyboards, microphones, speakers, touchscreens, and/or any other item useable to directly or indirectly input data into the computing device 2. Power supply 16 may include batteries, fuel cells, and/or any other component that acts as a power source to supply power to computing device 2 or to other network components.

Figure 2:
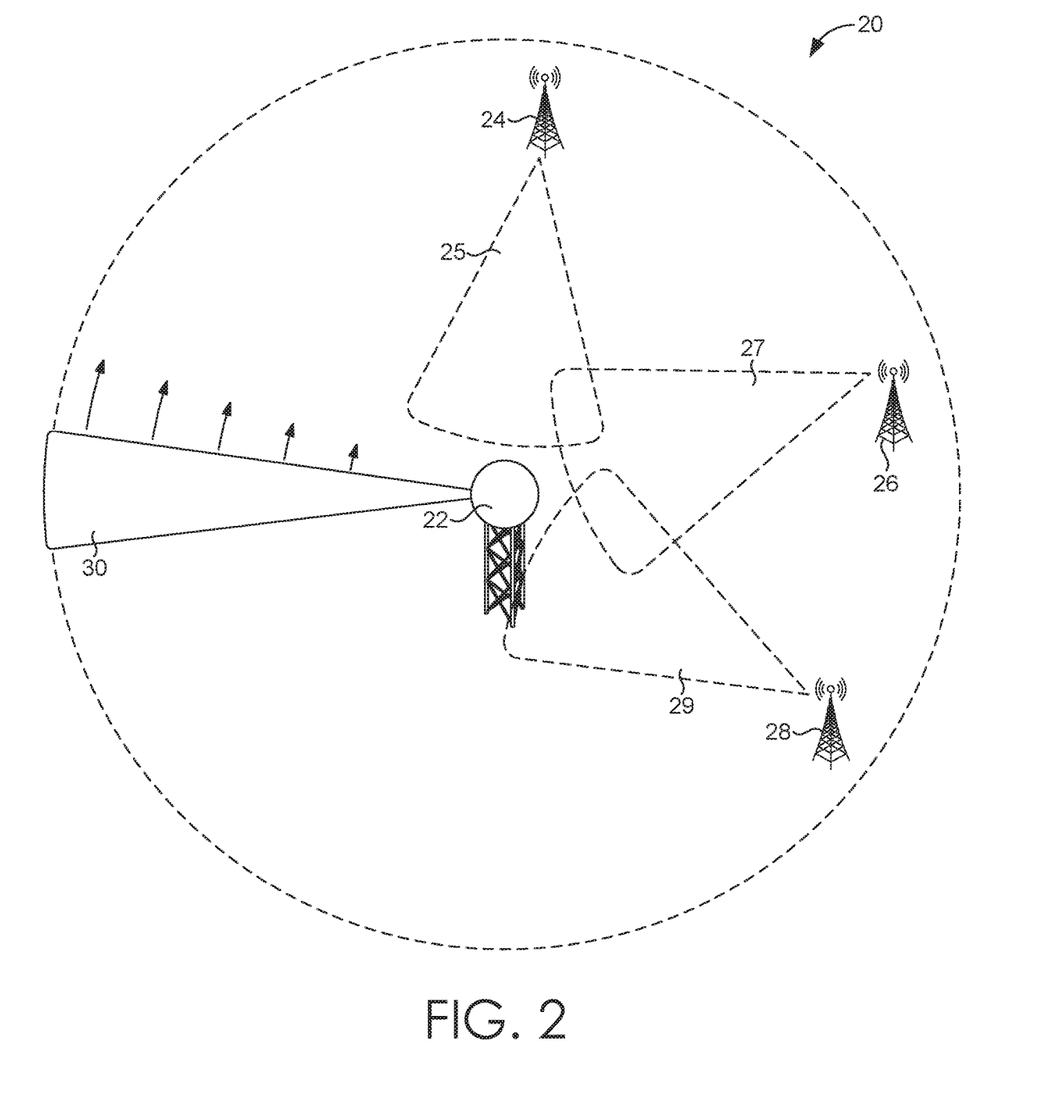
FIG. 2 depicts an operating environment with a radar installation and a plurality of broadcast cells that form part of a wireless communication network.

Referring now to FIG. 2, an example operating environment 20 in which aspects of the present technology are implemented is shown. The operating environment 20 includes a radar installation 22 that emits a signal. The operating environment 20 also includes a plurality of broadcast cells 24, 26, 28 that emit respective signals to provide coverage for a wireless communication network associated with the broadcast cells 24, 26, 28. It should be understood that the radar installation 22 shown in FIG. 2 represents one example of a signal-generating source that may operate in proximity to a wireless network and potentially cause signal interference that can be mitigated using the systems, methods, and devices/assemblies/apparatuses described herein. Therefore, it should be understood that other types of signal-generating sources may exist in the operating environment 22 shown in FIG. 2 and cause interference that is detected and mitigated similarly using the technology described herein. In this sense, the signal detection and mitigation processes described herein are applicable to a variety of different types of signals, and not only to radar.

Returning to FIG. 2, the broadcast cells 24, 26, 28 each provide a respective sector of coverage 25, 27, 29 for the wireless network. The broadcast cells 24, 26, 28 also utilize a designated frequency band for signal transmissions associated with their wireless network. To provide adequate coverage in a network, broadcast cells, such as the broadcast cells 24, 26, 28 shown in FIG. 2, may, in certain circumstances, need to be located in proximity to an external signal-generating source, such as the radar installation 22 shown in FIG. 2. As a result, in certain circumstances, the signals emitted from the broadcast cells 24, 26, 28 and the nearby external signal-generating source may overlap and/or cause interference with each other. In this regard, with respect to the example shown in FIG. 2, the radar installation 22 produces a radar emission 30 that rotates, sweeping across the operating environment 20 and, at times, overlapping and/or being oriented towards the broadcast cells 24, 26, 28. Each time the radar emission 30 is swept across the broadcast cells 24, 26, 28 such that signal orientation is aligned, there is a potential for signal interference, depending on the characteristics of the signals being emitted towards each other and the signal receiving equipment at the radar installation 22 and the broadcast cells 24, 26, 28.

In reference to the signal characteristics, the broadcast cells 24, 26, 28 and the radar installation 22 may utilize separate frequency bands to limit signal interference between their respective emitted signals. However, as discussed above, even when separate frequency ranges are utilized, out-of-band emissions emitted by the broadcast cells 24, 26, 28 may still be encountered by the radar installation 22, creating potential signal interference and/or damage to signal processing equipment. The out-of-band emissions may be reduced and/or controlled using techniques such as digital signal processing and/or signal filters as described herein. However, as discussed above, with relatively high density antenna configurations (e.g., FD or Massive MIMO configurations), the ability to control out-of-band emissions may be limited, and therefore, additional signal interference mitigation systems and processes may be needed.

Figure 3:
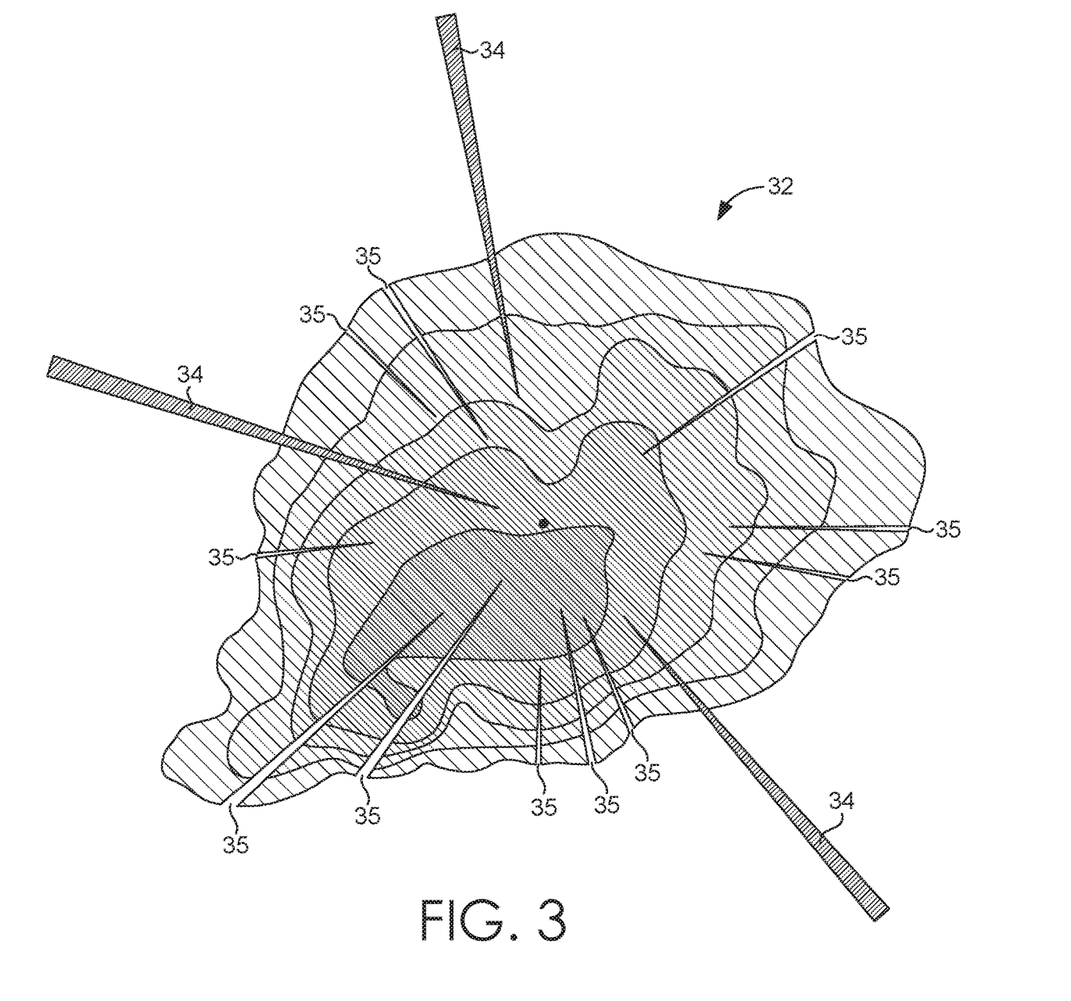
FIG. 3 depicts a radar coverage map showing interference caused by out-of-band emissions from a wireless communication network.

Referring now to FIG. 3, a radar map 32 showing interference from out-of-band emissions generated by wireless network signals is provided. The radar map 32 may be generated, for example, by the radar installation 22 shown in FIG. 2. In operation, a radar emission, such as the radar emission 30 shown in FIG. 2, is swept in a 360 degree circle, covering the area shown in FIG. 3 and repeatedly generating a version of the radar map 32. Broadcast cells, such as the broadcast cells 24, 26, 28 shown in FIG. 2, located within range of the radar installation 22 that are emitting signals having out-of-band emissions that fall within the frequency range used by the radar installation 22 can cause interference and/or be registered on the radar map 32 as shown in FIG. 3.

For example, when a radar installation detects a signal that includes out-of-band emissions that fall within the radar installation's frequency band, the radar installation's signal processing equipment may be affected and/or overloaded. For example, one result of this may be a radar spike or strobe 34 that appears on the radar map 32, as shown in FIG. 3. FIG. 3 shows numerous strobes 34 caused by numerous wireless network broadcast cells emitting signals that include the out-of-band emissions. Another possible result of exposing a radar installation to out-of-band emissions that fall within the radar installation's frequency band is radar "desensitization," or rather, the de-sensitizing of the radar's signal detecting/processing equipment. In this circumstance, the detected out-of-band emissions shift, at least temporarily, the range of amplitudes detectable by the radar installation. This causes certain weaker portions of the radar installation's frequency band to be undetectable or otherwise more difficult to detect. This type of reduced detection capability is shown in FIG. 3 by the gaps 35 in the radar map 32. This effect is discussed further with respect to FIG. 6.

Figure 4:
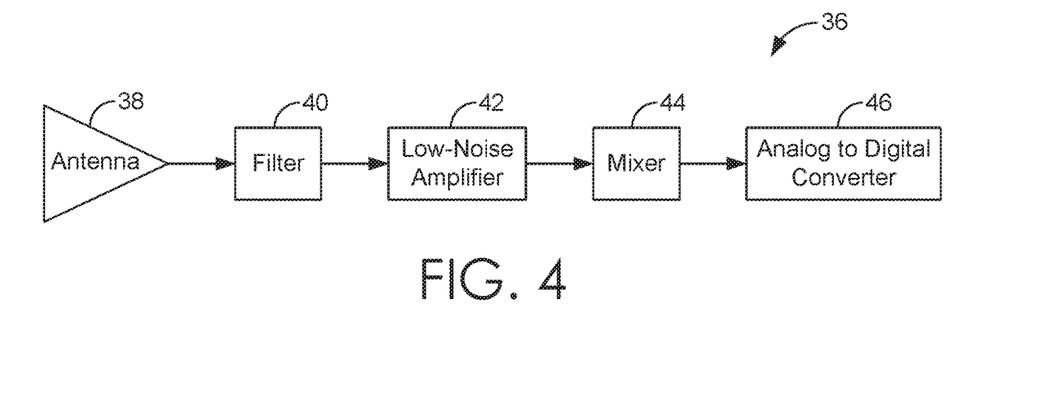
FIG. 4 depicts a diagram of an example signal processing system, in accordance with an embodiment of the present technology.

Referring now to FIG. 4, an example signal receiving and processing system 36 is provided, in accordance with an embodiment of the present technology. The system 36 shown in FIG. 4 may be used to processes different types of signals (e.g., wireless network signals, radar emission reflections, etc.). The system 36 includes an antenna 38, a filter 40, a low-noise amplifier 42, a mixer 44, and an analog-to-digital converter 46, which are arranged in a sequence from left to right.

To illustrate one example use of the system 36, the antenna 38 receives a signal, such as a wireless network signal or radar reflection as discussed herein. The filter 40, which may actually be multiple filters in different contemplated aspects, is used to process the received signal to eliminate certain frequencies or frequency ranges. For example, the filter 40 may be used to at least partially reduce or eliminate frequencies that fall outside of a radar installation's operating frequency range, to reduce or limit interference from such frequencies. Further, as discussed herein, when out-of-band emissions are present in the received signal, and the out-of-band emissions fall within the radar installation's operating frequency range, the filter 40 may not be able to prevent the out-of-band emissions from being transferred to the other signal processing components in the system 36, such as the low-noise amplifier 42. This may cause the components to be exposed to a signal of much greater gain and power than normal, which can disrupt or otherwise negatively impact such components.

Continuing with the components of the system 36, the low-noise amplifier 42 is configured to process a signal received by the antenna 38 and amplify its gain to allow for further signal processing. The mixer 44 may be used to modify signal characteristics, such as the frequency, or to demodulate the signal. The analog-to-digital converter 46 is used to convert the processed analog signal into a digital signal. It is contemplated herein that in different embodiments, more, fewer, and/or alternative components may be used in a signal receiving and processing system like the system 36 shown in FIG. 4, and the selection and arrangement of components depicted in FIG. 4 is provided only as one example.

Figure 5:
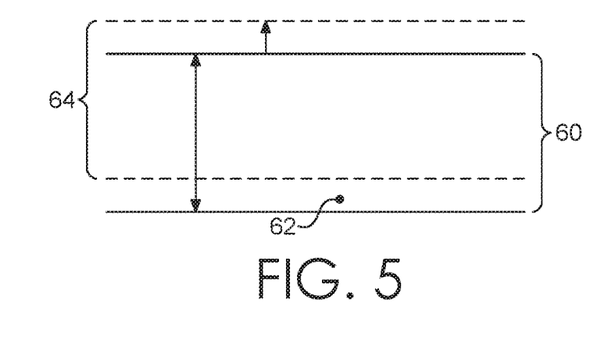
FIG. 5 depicts a visual representation of radar desensitization that occurs due to signal interference.

Referring now to FIG. 5, a visual representation of radar desensitization caused by signal interference from out-of-band emissions is provided. As discussed with respect to FIG. 3 and the gaps 35 shown on the radar map 32, when a broadcast cell emits a signal over a wireless communication network that includes out-of-band emissions that fall within a radar installation's operating frequency range, and such out-of-band emissions are detected and processed by the radar installation, signal desensitization can occur.

For example, a radar installation may use signal detection equipment that is adapted to detect signals (e.g., radar reflections) that fall within the amplitude range 60 shown in FIG. 5. However, when strong out-of-band emissions falling within the frequency range of the radar are detected by the radar installation, the range of amplitudes detectable by the radar installation may shift upward as shown in FIG. 5. As a result, a received signal of amplitude 62 that falls within the amplitude range 60 is actually undetectable by the radar installation because radar desensitization has caused the detectable amplitude range to be shifted to the amplitude range 64. This can cause gaps in radar detection, as shown by the gaps 35 depicted in FIG. 3, that reduces the effectiveness of the radar detection at the radar installation, as least temporarily.

Figure 6:
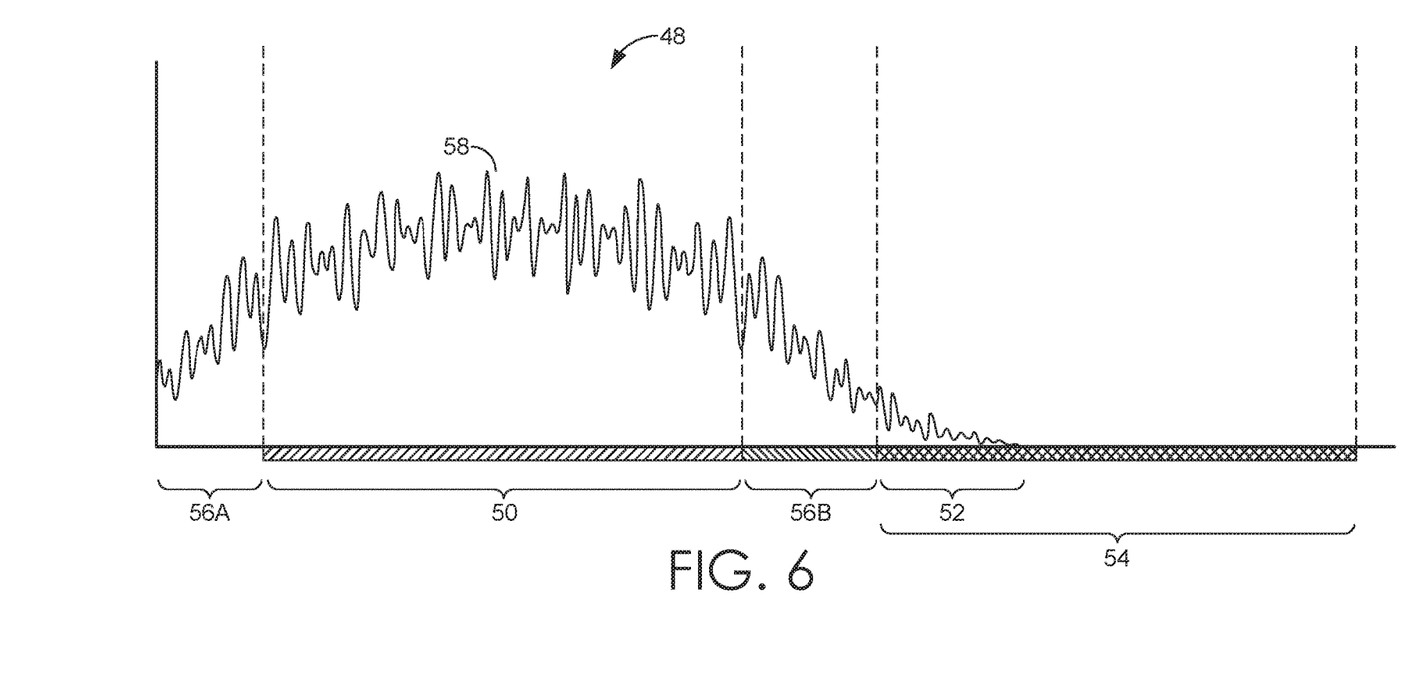
FIG. 6 depicts a frequency band produced by a broadcast cell operating in a wireless communication network that includes in-band emissions and out-of-band emissions.

Referring to FIG. 6, a frequency band 48 showing in-band emissions and out-of-band emissions from a broadcast cell operating in a wireless communication network is provided, in accordance with an embodiment of the present technology. The frequency band 48 shown in FIG. 6 is generated by a signal 58 emitted from a broadcast cell. The frequency range 48 includes an "in-band" frequency range 50, which represents a frequency range within which the broadcast cell is designated to transmit and receive signals. The frequency band 48 also includes an "out-of-band" frequency range 52, which represents a frequency range that falls outside of the designated "in-band" frequency range 50, within which the broadcast cell is not designated to transmit and receive signals.

Further, as shown in FIG. 6, the "out-of-band" frequency range 52 forms at least part of a frequency range 54 which may be utilized by another provider (e.g., another wireless network provider, a radar installation, or another type of signal-generating provider). Further shown in FIG. 6 are intermediary frequency ranges 56A, 56B, which may represent frequency ranges used by other providers, or frequency ranges that are not used and that are simply present to help limit signal overlap caused by out-of-band emissions. It is contemplated that in different aspects, the frequency ranges 50, 54, 56A, and 56B may be of any range. Further, the relative size of the bands may be different than depicted in FIG. 6. To provide one non-limiting example, the "in-band" frequency range may be 2495-2690 Megahertz, and "out-of-band" frequency range may be 2700-2900 Megahertz. Other ranges are contemplated herein.

Returning to the "out-of-band" frequency range 52 shown in FIG. 6, the strength of the signal 58 that is emitted by the broadcast cell peaks within the "in-band" frequency range 50, and gradually tapers off in strength towards the intermediary frequency range 56B and the frequency range 54. As discussed herein, the amount of signal present in the "out-of-band" frequency range 54 shown in FIG. 6 may be controlled, to an extent, with digital signal processing and/or with signal filters installed on the transmission equipment of the broadcast cell. However, as previously mentioned, in relatively compact and high density antenna arrays, such signal manipulation techniques may be limited or insufficient with respect to reducing out-of-band emissions to a desired level. For example, as shown in FIG. 6, a certain strength of out-of-band emissions is present in the frequency range 54. Depending on the operating environment, a certain amount of out-of-band emissions may be permitted, but in certain circumstances (e.g., when the out-of-band frequency 54 is for radar, such as flight radar associated with aviation), it may be necessary to have minimal or no out-of-band emissions. Therefore, in such circumstances, systems and methods for limiting interference caused by the out-of-band emissions may be implemented.

Mitigating Signal Interference with Controlled Signal Transmission

Figures 7, 8, 9:
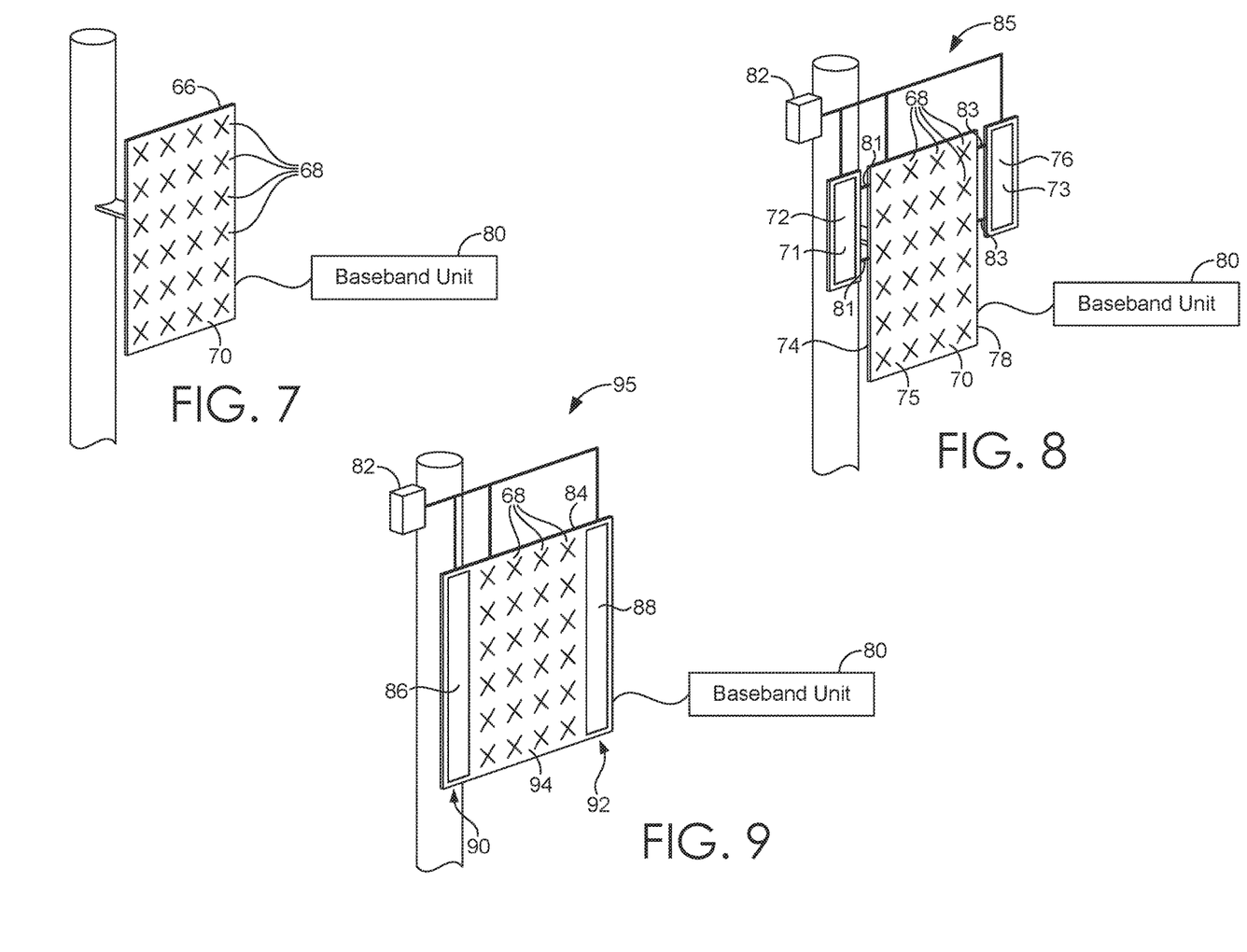
FIG. 7 depicts one example antenna used to transmit and receive signals over a wireless network, in accordance with an embodiment of the present technology.
FIG. 8 depicts the antenna of FIG. 7 with sensors attached that are configured to detect a signal directed at the antenna, in accordance with an embodiment of the present technology.
FIG. 9 depicts another example antenna having integrated sensors that are configured to detect a signal directed at the antenna, in accordance with an embodiment of the present technology.

Referring now to FIG. 7, an antenna 66 with a plurality of transmitting and receiving components 68 is provided, in accordance with an embodiment of the present technology. The antenna 66 may form part of a broadcast cell, such as one of the broadcast cells 24, 26, 28 shown in FIG. 2, and may be used to transmit and receive signals over a wireless network. The plurality of transmitting and receiving components 68 are arranged in a relatively compact configuration on a panel 70. For the example embodiment shown in FIG. 7, the antenna includes 24 transmitting and receiving components arranged in a 4×6 configuration. In other contemplated embodiments, more or fewer transmitting and receiving components may be used (e.g., 12×12, 64×64, 128×128, etc.). Each transmitting and receiving component 68 shown on the panel 70 in FIG. 7 may be coupled to a radio that generates a signal for transmission over the wireless network. The signals emitted from the transmitting and receiving components 68 located on the panel 70 of the antenna 66 may collectively form a sector of coverage.

Figure 13:
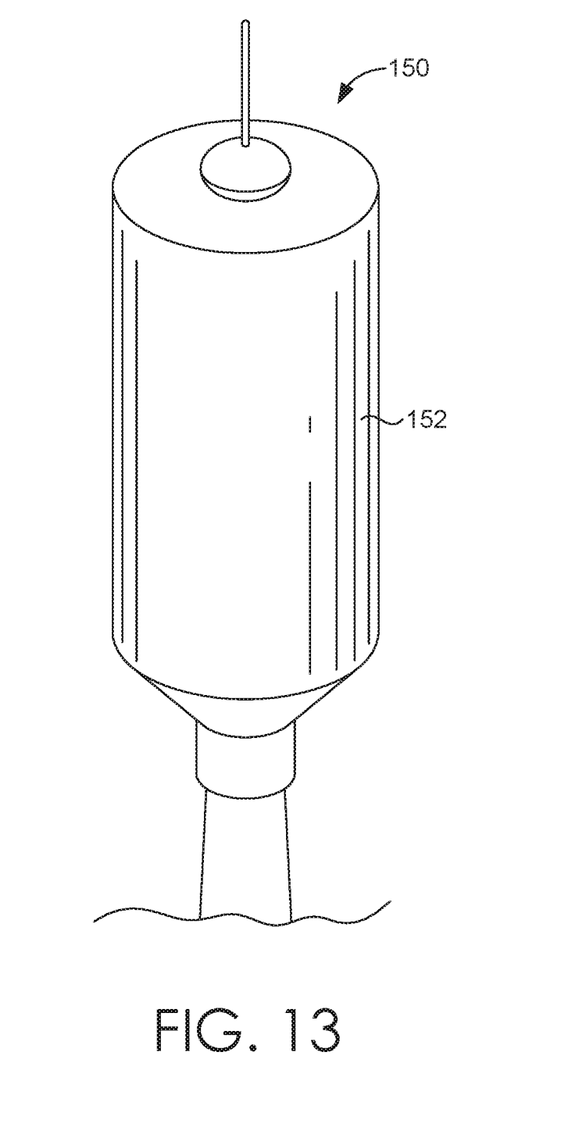
FIG. 13 depicts one example radome within which the antennas and sensors described herein may be enclosed, in accordance with an embodiment of the present technology.

Further depicted in FIG. 7 is a baseband unit 80 that is communicatively connected to the antenna 66 and/or components thereof. The baseband unit 80 is configured to provide various signal processing operations. In FIG. 7, the baseband unit 80 is shown for example purposes next to the antenna 66, but in actual implementation, it may be located at various locations about a broadcast cell, such as at the base. Each of the components 66, 68, 70 shown in FIG. 7 may be enclosed within a radome, one non-limiting example of which is depicted in FIG. 13.

Referring to FIG. 8, an example system 85 for detecting and mitigating signal interference is provided, in accordance with an embodiment of the present technology. The system 85 includes the antenna 66 shown in FIG. 7, along with a pair of sensors 72, 76 that are coupled to opposite sides 74, 78 of the antenna 66. Each sensor 72, 76 is attached to the respective side 74, 78 of the antenna 66 with an attachment structure 81, 83. The sensors 72, 76 are adapted to detect a particular signal that is directed at the antenna 66. In one aspect, the sensors 72, 76 may be adapted to detect a radar emission, a wireless network signal, or another signal, including one that is identified based on certain signal characteristics, such as frequency and/or frequency range (e.g., a signal in the range of 2.7-3 Gigahertz may be detectable in the case of detecting a radar emission). This detection capability allows the sensors 72, 76 to detect signals that may potentially cause/encounter interference with/due to the signal emitted by the antenna 66 (e.g., due to out-of-band emissions in the signal emitted by the antenna 66). The sensors 72, 76 may each comprise an antenna coupled to an amplifier, and may also include filters that allow the antenna to receive only or primarily a desired frequency, such as, for example, 2.7-3 Gigahertz when the signal detection is for a radar emission. The amplifiers associated with the sensors 72, 76 may also have integrated signal protection elements that protect the sensors' signal processing components from damage due to signal overload. For example, one such element may be a Schottky diode or Zener diode that protects the sensors 72, 76 from overload when a high-powered signal (e.g., a radar emission) is directly received by the sensors 72 and/or 76. Further, in the case of Time Division Duplexing, or "TDD," signal operation, the sensors 72, 76 may only remain active during the signal transmitting period of the TDD operation, instead of remaining active continuously as may be the case with Frequency Division Duplexing, or "FDD." Both of the aforementioned signal operations are contemplated for use with the sensor operation described herein.

In the example embodiment depicted in FIG. 8, the sensors 72, 76 are positioned on the opposite sides 74, 78 of the antenna 66 such that they are oriented to face the same direction as the antenna 66. This allows the sensors 72, 76 to detect a signal that is directed at the antenna 66 along its direction of signal transmission. More specifically, as shown in FIG. 8, a forward-facing portion 71 of the sensor 72, a forward-facing portion 73 of the sensor 76, and a forward-facing portion 75 of antenna 66 are oriented in the same direction, such that their respective directions of signal detection/transmission are in parallel. It is contemplated that in other embodiments, the forward-facing portions 71, 73, 75 may be at an angle relative to each other, such as up to 1, 2, 3, 4, or 5 degrees, in addition to other amounts. For example, in such an embodiment, the forward-facing portions 71, 73 of the sensors 72, 76 may be at a 0-5 degree angle relative to the forward-facing portion 75 of the antenna 66.

The positioning of the sensors 72, 76 along the sides 74, 78 of the antenna 66 allows the system 85 to detect a signal that is swept across the antenna 66, such as a radar emission. More specifically, as described further with respect to FIGS. 10A-10B, when the sensors 72, 76 are adapted to detect a radar emission, and when the radar emission is swept across the antenna 66, the sensor 72 or the sensor 76 can initially detect the radar emission before it crosses the panel 70 and the transmitting and receiving components 68 thereon. That sensor 72 or 76 can then provide feedback indicating that the radar emission is detected. Subsequently, the signal transmission from the antenna 66 can be deactivated, and remain deactivated until the radar emission has fully crossed the system 85. Once the radar emission has swept across the sensors 72, 76 and the antenna 66, and is no longer detected by either of the sensors 72, 76, the signal transmission from the antenna 66 can be reactivated. It is also contemplated that when a non-sweeping, or static, radar emission (or other signal) is detected by at least one of the sensors 72, 76, the signal transmission from the antenna 66 can remain deactivated indefinitely until the radar emission is no longer detected by the sensors 72, 76. For example, such adaptive control of signal transmission may be used for certain weather-related radar emissions (e.g., a static NEXRAD emission).

FIG. 8 depicts the antenna 66 having a pair of sensors 72, 76 located on the sides 74, 78 of the antenna 66. However, in alternative embodiments, each side 74, 78 of the antenna 66 may actually have multiple sensors positioned in any arrangement or spacing. It may be advantageous to have multiple sensors located about the antenna 66 for several reasons. For example, positioning multiple sensors about the perimeter of the antenna 66 and/or on the antenna panel 70 can increase signal detection capability, and can provide redundancy in case of sensor failure. In further embodiments, the sensors may be mounted at different angular orientations relative to the antenna 66, which may increase signal detection capability by allowing the sensors to detect signals directed at the antenna from oblique orientations (e.g., 0-5 degrees from the antenna's alignment). In some embodiments, the position and/or orientation of the sensors may be adjustable, allowing signal detection capability of the sensors to be further modified.

FIG. 8 further depicts a controller 82 that is communicatively connected to the sensor 72, the sensor 76, and the transmitting and receiving components 68 of the antenna 66. The controller 82 is configured to control the activation and deactivation of signal transmission from the transmitting and receiving components 68 of the antenna 66 based on feedback from the sensors 72, 76. For example, sensor 72 and/or 76 may detect a radar emission that is directed at the antenna 66 and then communicate the detection of the radar emission to the controller 82. The controller 82 can then deactivate the signal transmission from the transmitting and receiving components 68 while the radar emission is detected by the sensors 72 and/or 76.

This deactivation may continue indefinitely if the radar emission is statically oriented (e.g., a weather-related radar emission directed in a certain direction) or may simply continue for a period of time in which the radar emission is detected (e.g., the period during which the radar emission sweeps across the antenna 66 and the sensors 72, 76). Once the radar emission is no longer detected by either sensor 72, 76, the controller 82 can reactivate the signal transmission from the transmitting and receiving components 68 of the antenna 66 to resume wireless network operation from the antenna 66. Additional example scenarios that involve detecting a radar emission, deactivating signal transmission, and reactivating signal transmission when the radar emission is no longer detected are described with respect to FIGS. 10A-10B.

The deactivation of signal transmission as discussed above may cause an interruption in data transmission to mobile devices operating within the wireless communication network. Therefore, in addition to controlling the activation/deactivation of signal transmission from the antenna 66, the controller 82 may also buffer data (e.g., holding or queuing it) for later transmission once signal transmission from the antenna 66 is reactivated. For example, when a radar emission is detected by the sensors 72, 76, the signal transmission from the antenna 66 is deactivated by the controller 82. At the same time, the controller 82 buffers data packets received while the signal transmission is deactivated. Once the radar emission is no longer detected, and the signal transmission from the antenna 66 is reactivated by the controller 82, the data packets are communicated over the wireless network as in normal wireless network operation. FIG. 8 shows the controller 82 coupled locally with the antenna 66, such that it might be positioned with the antenna 66 in a common enclosure (e.g., a radome as shown in FIG. 13). The controller 82 may also be located elsewhere, such as at a baseband unit or at another processing component associated with the antenna 66.

Referring to FIG. 9, another example system 95 for detecting and mitigating signal interference is provided, in accordance with an embodiment of the present technology. The signal interference may be caused by radar emissions, or may be caused by another source that is similarly detectable by the system 95, as discussed elsewhere herein. The antenna 84 shown in FIG. 9 includes the transmitting and receiving components 68 discussed herein with respect to FIGS. 7 and 8, and also includes sensors 86, 88 that are used for detecting signal emissions directed at the antenna 84.

The system 95 is arranged so that the sensors 86, 88 are integrated into a panel 94 of the antenna 84 on which the transmitting and receiving components 68 are located, instead of being provided as separately attached structures, as shown in FIG. 8. More specifically, the antenna 84 includes a sensor 86 positioned adjacent a side 90 of the antenna 84 and includes a sensor 88 positioned adjacent a side 92 of the antenna 84. This allows for signal detection on both sides of the antenna 84. The sensors 86, 88 may be integrated into the panel 94 such that they at least partially form the sides 90, 92 of the panel 94 as shown in FIG. 9, or, in another embodiment, the sensors 86, 88 may be spaced from the outside edges of the panel 94, such that they are positioned more inward on the panel 94. The sensors 86, 88 may be positioned at such outside boundaries of the antenna 84 to allow for detection of interfering signals prior to such signals being in direct alignment with the signal emitted by the antenna 84. The antenna 84 shown in FIG. 9 further includes the controller 82, which, like in the system 85, controls the activation/deactivation of signal transmission from the antenna in order to mitigate signal interference.

Example Processes for Mitigating Signal Interference

Referring now to FIGS. 10A-10D, an example process for mitigating interference between a wireless network signal and a signal emitted from a source external to the wireless network is provided, in accordance with an embodiment of the present technology. In the example shown in FIGS. 10A-10D, the external source is radar. More specifically, FIGS. 10A-10D depict an operating environment 100 that includes a radar installation 102 and a broadcast cell 104 that operates as a signal transmitting and receiving platform for a wireless communication network. The radar installation 102 may be used to provide weather-related radar, aviation-related radar, and/or other types of radar operations. The broadcast cell 104, as shown in FIGS. 10A-10D, includes a plurality of antennas 106, 108, 110 positioned about the broadcast cell 104, allowing them to transmit and receive wireless signals in different directions to form respective sectors of coverage emitted from the broadcast cell 104.

The antenna 106 mounted on the broadcast cell 104 includes signal detection sensors 112, 114, which are positioned on opposite sides of the antenna 106. More specifically, the sensors 112, 114 are positioned on the outer boundaries of a panel 116 on which the transmitting and receiving components of the antenna 106 are located. The sensors 112, 114 may be similar to the other sensors described herein in their ability to detect signal emissions directed at the antenna 106. In the example of FIGS. 10A-10D, the sensors 112, 114 are configured to detect radar emissions/signals directed at the antenna 106 from the radar installation 102.

FIGS. 10A-10D further depict, in sequence, how a radar emission 120 produced by the radar installation 102 follows a sweeping pattern across the broadcast cell 104. The antenna 106 also emits a wireless signal 118. As discussed herein, the wireless signal 118 may include out-of-band emissions that fall within the frequency range used by the radar installation 102. Further, the radar emission 120 may, at times, be oriented such that it will directly encounter the wireless signal 118 and potentially cause/encounter interference. Therefore, to limit the potential or impact of such signal interference, the sensors 112, 114 on the antenna 106 can be used to detect the radar emission 120, and a controller, such as the controller 82 discussed with respect to FIG. 8, can be used to deactivate signal transmission from the antenna 106 while the radar emission 120 is directed at the antenna 106, reducing or eliminating interference between the wireless signal 118 and the radar emission 120. Once the radar emission 120 has crossed the antenna 106 such that it is no longer detected by the sensors 112 and/or 114, the controller can reactivate the signal transmission from the antenna 106 to resume normal wireless network operation. Data that has been buffered during the signal deactivation period can then be transmitted over the wireless network using the antenna 106.

Figure 10A:
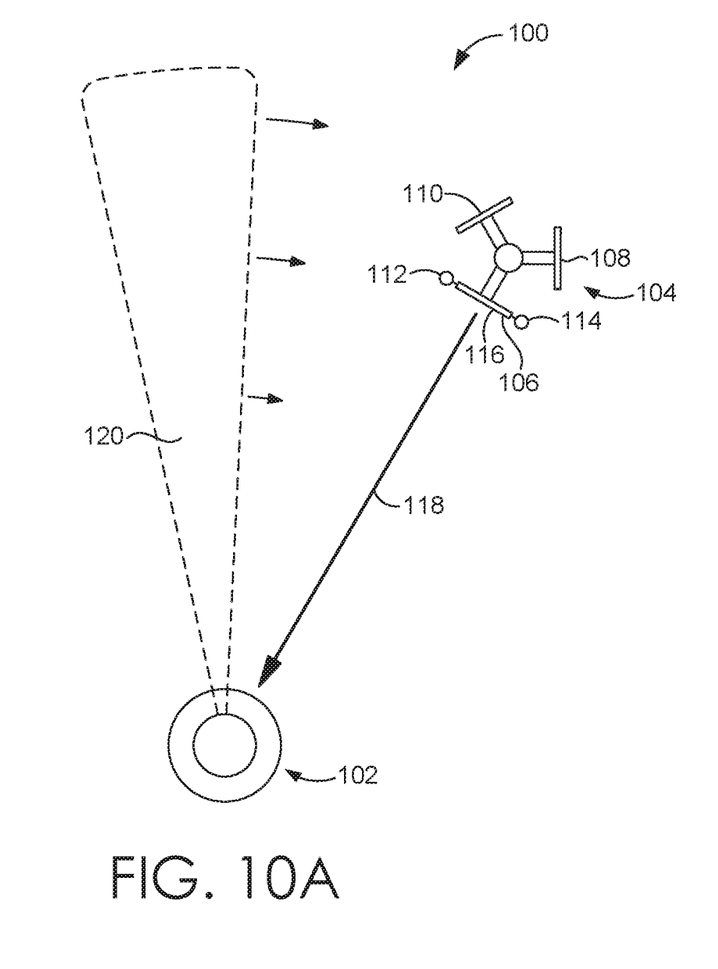
FIGS. 10A-10D depict one example of a broadcast cell encountering, detecting, and mitigating signal interference, in accordance with an embodiment of the present technology.
Figure 10B:
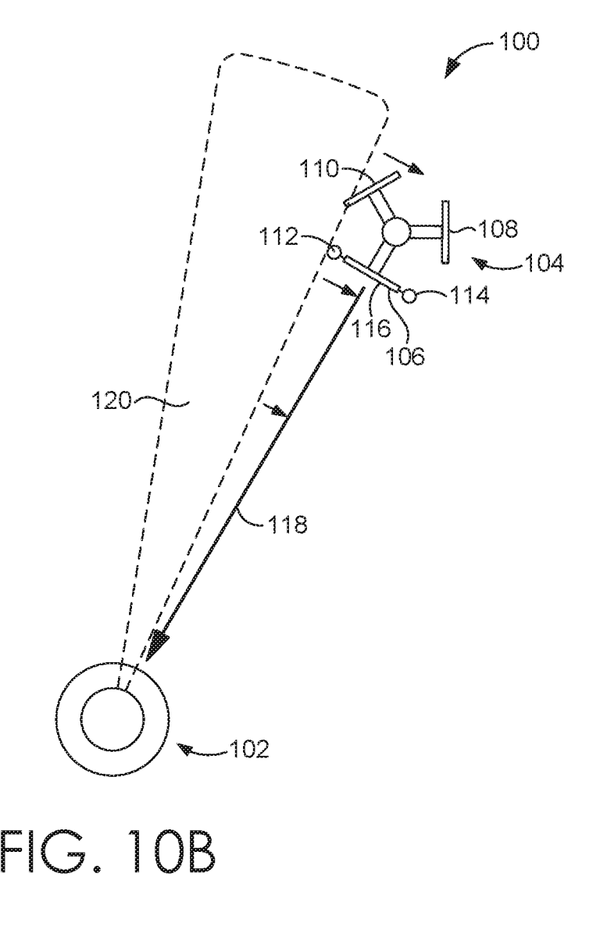
Figure 10C:
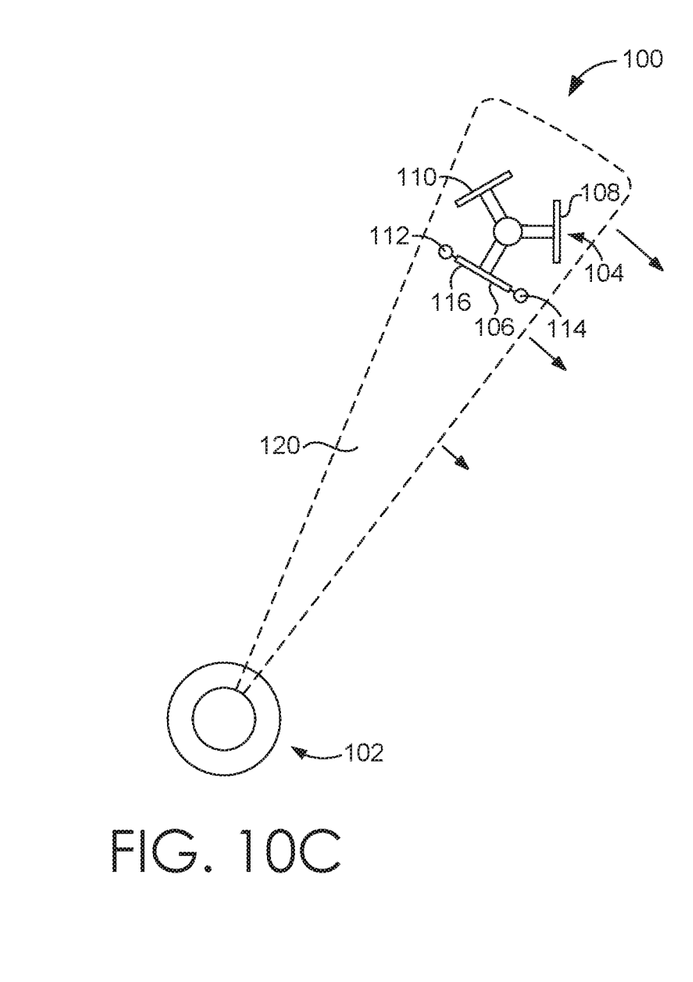
Figure 10D:
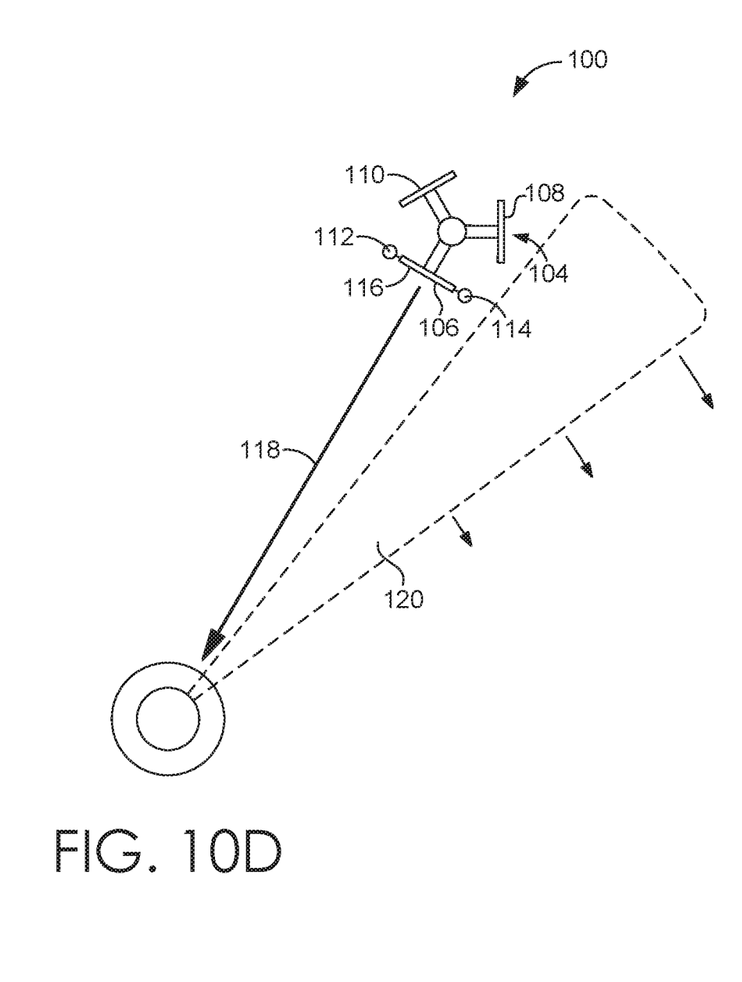

Turning to the sequence depicted in FIGS. 10A-10D, FIG. 10A depicts how the radar emission 120 is projected from the radar installation 102, sweeping across an area and toward the broadcast cell 104 that is emitting the wireless signal 118 from its antenna 106. FIG. 10B shows the radar emission 120 just reaching the sensor 112 on a side of the antenna 106, at which time the radar emission is detected by the sensor 112. This information is relayed to a controller as discussed herein. The controller deactivates signal transmission from the antenna 106, as shown in FIG. 10C from the absence of the wireless signal 118, reducing or eliminating interference that would otherwise exist due to the conflicting radar emission 120 and wireless signal 118. In FIG. 10C, both sensors 112, 114 are detecting the radar emission 120. In embodiments, the signal deactivation may be controlled based on detection of the radar emission 120 by one sensor, a portion of the sensors, or all of the sensors. FIG. 10D shows how once the radar emission 120 has swept across the sensor 112, the antenna 106, and the sensor 114, the wireless signal 118 from the antenna 106 may be reactivated by the controller so that the broadcast cell 104 may resume normal network operation.

This type of on/off control of an antenna's signal transmission based on sensors' detection of incoming signals can reduce or eliminate signal interference between wireless network signals and other nearby signal emissions, such as radar emissions as shown in FIGS. 10A-10D. This may also reduce or limit the potential harm to signal transmitting, receiving, and/or processing equipment that can be caused by unanticipated large signal inputs being received and processed. For example, signal components such as a low noise amplifier or a mixer as discussed herein may be less likely to be exposed to signals that can cause an overload or failure of the equipment.

Figure 11:
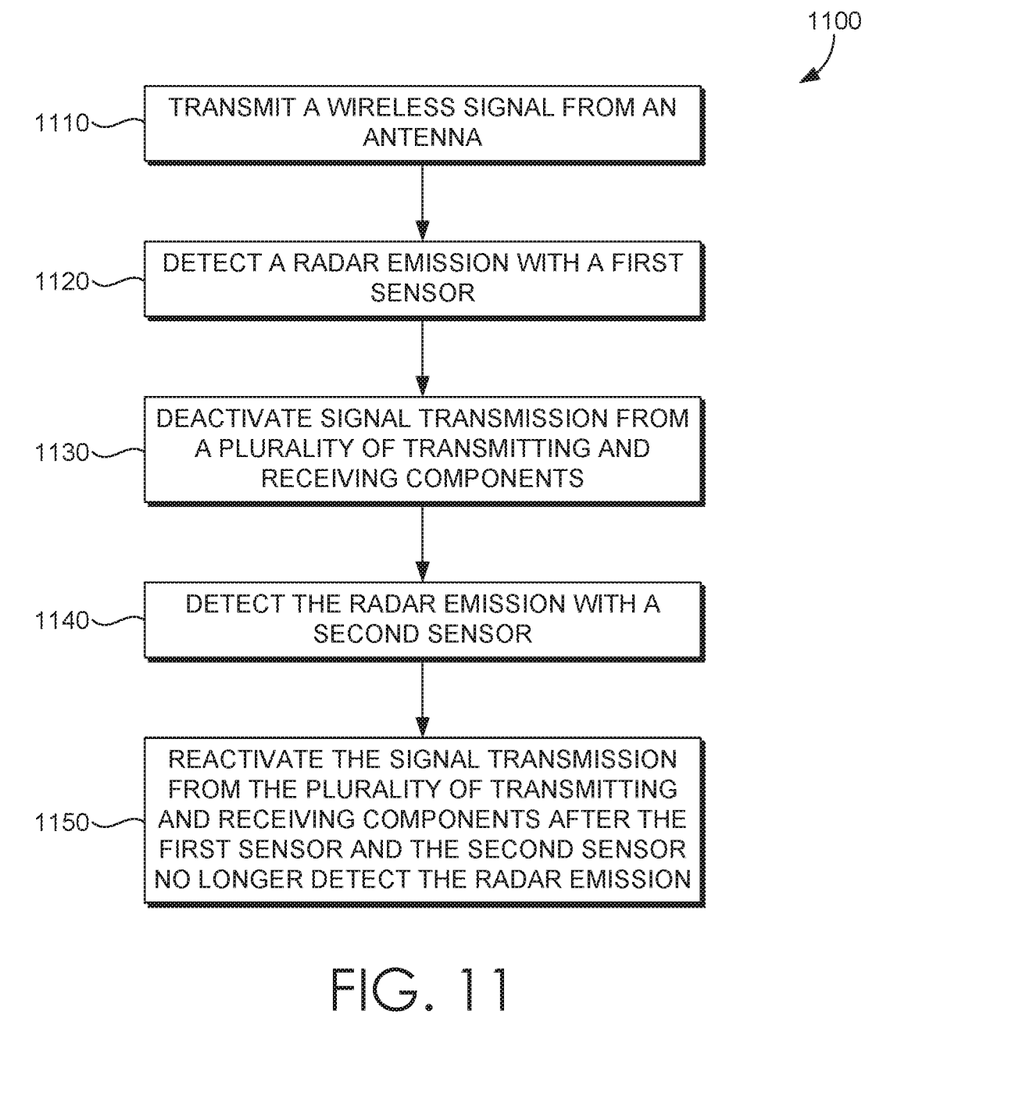
FIG. 11 depicts a block diagram of an example process for mitigating signal interference, in accordance with an embodiment of the present technology.

Referring now to FIG. 11, a block diagram of an example process 1100 for mitigating interference between wireless network signals and radar emissions is provided, in accordance with an embodiment of the present technology. At block 1110, a wireless signal, such as the wireless signal 118 shown in FIG. 10A, is transmitted from an antenna, such as the antenna 106 shown in FIGS. 10A-10D. The antenna may include an antenna panel, such as the antenna panel 70 shown in FIG. 8, on which a plurality of transmitting and receiving components, such as the transmitting and receiving components 68 shown in FIG. 7, that send and receive signals over the wireless network, are mounted.

The signal transmitting and receiving components may be connected to one or more radios and/or to a controller, such as the controller 82 shown in FIG. 8. The antenna may further include sensors, such as the sensors 112, 114 described with respect to FIGS. 10A-10D, adapted to detect a signal directed at the antenna. In particular, in certain embodiments, the sensors may be configured and/or selected to detect a radar emission directed at the antenna, such as one emitted from a radar installation that is aviation-specific, weather-specific, military-specific, etc. The sensors and/or antenna may be coupled to the controller which is configured to activate and deactivate signal transmission from the antenna based on signal detection from the sensors.

At block 1120, a radar emission is detected with a first sensor, such as the sensor 112 shown in FIGS. 10A-10B. The detection may be based on the frequency, signal characteristics, or other identifying attributes of the signal (e.g., the orientation). At block 1130, signal transmission from the plurality of transmitting and receiving components of the antenna is deactivated. The deactivation may be initiated subsequent to the detection of the radar emission by the first sensor. Further, as discussed herein, the deactivation may be initiated by the controller, which may be locally coupled to the antenna and components thereof, and/or which may be coupled from another location, such as a baseband unit. At block 1140, the radar emission is detected by the second sensor. The second sensor may detect the radar emission subsequent to the first sensor detecting the radar emission (e.g., such as when the radar emission is swept across the first and second sensors in sequence), or alternatively, in other circumstances, the radar emission may be detected by both sensors simultaneously (e.g., when a radar emission is statically directed at the antenna/sensors). At block 1150, the signal transmission from the plurality of transmitting and receiving components is reactivated after the first sensor and the second sensor no longer detect the radar emission. The controller may control the activation of the signal transmission, and also may initiate the sending of data packets buffered while the signal transmission was deactivated during detection of the radar emission.

Figure 12:
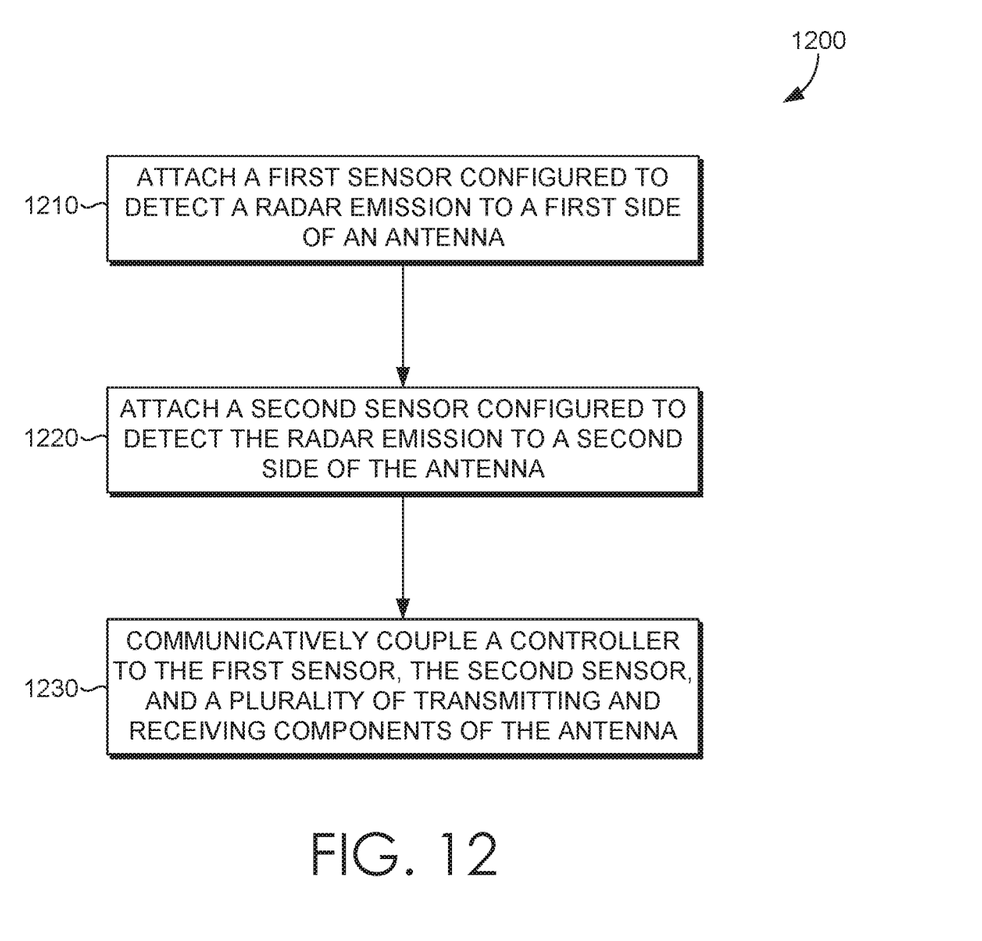
FIG. 12 depicts a block diagram of an example process for configuring an antenna to mitigate signal interference, in accordance with an embodiment of the present technology.

FIG. 12 depicts a block diagram of an example process 1200 for configuring an antenna to mitigate interference between the antenna and a radar installation, in accordance with an embodiment of the present technology. At block 1210, a first sensor, such as the sensor 112 shown in FIGS. 10A-10D, configured to detect a first radar emission, such as the radar emission 120 shown in FIGS. 10A-10D, is attached to a first side of the antenna, such as the side 74 of the antenna 66 shown in FIG. 8. At block 1220, a second sensor, such as the sensor 114 shown in FIGS. 10A-10D, is attached to a second side of the antenna, such as the side 78 of the antenna 66 shown in FIG. 8. Attaching the sensors to the antenna may involve fixedly securing the sensors with securing elements, such as the attachment structures 81, 83 shown in FIG. 8, or may involve integrating the sensors into a panel of the antenna, such as the panel 94 shown in FIG. 9, among other attachment processes. At block 1230, a controller, such as the controller 82 shown in FIG. 8, is communicatively coupled to the first sensor, the second sensor, and the plurality of transmitting and receiving components of the antenna. As described herein, the controller may control signal activation/deactivation of the antenna based on signal detection feedback from the sensors.

FIG. 13 depicts an example radome 150 within which an antenna and the sensors discussed herein may be enclosed, in accordance with an embodiment of the present technology. The radome 150 includes a housing 152 that is shaped to at least partially enclose various components of a broadcast cell, such as an antenna, including the transmitting and receiving components, panel, and radios thereof, a controller, sensors used to detect interference caused by, for example, a radar emission, as well as other components.

The present technology has been described in relation to particular embodiments, which are intended in all respects to be illustrative rather than restrictive. Alternative embodiments will become apparent to those of ordinary skill in the art to which the present technology pertains without departing from its scope. Different combinations of elements, as well as use of elements not shown, is possible and contemplated.

What is claimed is:

1. A system for mitigating interference between wireless network signals and radar emissions, the system comprising:
   an antenna comprising a plurality of transmitting and receiving components, each one of the plurality of transmitting and receiving components adapted to transmit and receive a wireless network signal over a first frequency range;
   a first sensor coupled to a first side of the antenna, the first sensor configured to detect a radar emission;
   a second sensor coupled to a second side of the antenna, the second sensor configured to detect the radar emission; and
   a controller communicatively coupled to the first sensor, the second sensor, and the antenna, wherein the controller is configured to:
      deactivate signal transmission from the plurality of transmitting and receiving components over the first frequency range when at least one of the first sensor and the second sensor detects the radar emission, and subsequently,
      reactivate signal transmission from the plurality of transmitting and receiving components over the first frequency range when the first sensor and the second sensor no longer detect the radar emission.

2. System of claim 1, wherein the wireless network signal is transmitted over the first frequency range and the radar emission is transmitted over a second frequency range, and wherein the wireless network signal includes out-of-band emissions that fall at least partially within the second frequency range.

3. The system of claim 1, wherein the deactivation of the signal transmission by the controller is based on a signal received from the at least one of the first sensor and the second sensor indicating that the radar emission is detected, and wherein the reactivation of the signal transmission by the controller is based on a signal received from the first sensor and the second sensor indicating that the radar emission is no longer detected.

4. The system of claim 1, wherein the controller is located at a baseband unit that is communicatively coupled to the first sensor, the second sensor, and the plurality of transmitting and receiving components.

5. The system of claim 1, wherein the controller is coupled to the antenna, the first sensor, and the second sensor locally within a radome that at least partially encloses the antenna, the first sensor, and the second sensor.

6. The system of claim 1, wherein the plurality of transmitting and receiving components are arranged on a panel, wherein the first sensor is oriented in a first direction, the second sensor is oriented in a second direction, and the plurality of transmitting and receiving components are each oriented in a third direction, and wherein the first, second, and third directions are parallel to each other and face a common direction.

7. The system of claim 6, wherein the first sensor is offset from the first side of the antenna a distance by a first attachment structure, and wherein the second sensor is offset from the second side of the antenna a distance by a second attachment structure.

8. The system of claim 1, further comprising:
a first plurality of additional sensors coupled to the first side of the antenna that are configured to detect the radar emission in conjunction with the first sensor, and
a second plurality of additional sensors coupled to the second side of the antenna that are configured to detect the radar emission in conjunction with the second sensor.

9. The system of claim 1, wherein the controller is configured to buffer data for later transmission while the signal transmission from the plurality of transmitting and receiving components over the first frequency range is deactivated.

10. The system of claim 1, wherein the plurality of transmitting and receiving components are arranged on a panel that comprises the first side and the second side, and wherein the first sensor is incorporated into the panel adjacent the first side and the second sensor is incorporated into the panel adjacent the second side.

11. Method for mitigating interference between wireless network signals and radar emissions, the method comprising:
transmitting a wireless signal over a first frequency range from an antenna comprising:
a plurality of transmitting and receiving components,
a first sensor coupled to a first side of the antenna and configured to detect a radar emission, and
a second sensor coupled to a second side of the antenna and configured to detect the radar emission;
detecting the radar emission with the first sensor;
deactivating signal transmission from the plurality of transmitting and receiving components over the first frequency range following detection of the radar emission by the first sensor;
detecting the radar emission with the second sensor; and
reactivating the signal transmission from the plurality of transmitting and receiving components over the first frequency range when the first sensor and the second sensor no longer detect the radar emission.

12. The method of claim 11, wherein the first sensor is offset from the first side of the antenna a distance and the second sensor is offset from the second side of the antenna a distance, and wherein the deactivation and reactivation of the plurality of transmitting and receiving components is performed by a controller that is communicatively coupled to the first sensor, the second sensor, and the plurality of transmitting and receiving components.

13. The method of claim 11, wherein the plurality of transmitting and receiving components are arranged on a panel comprising the first side and the second side, wherein the first sensor is integrated into the panel adjacent the first side and the second sensor is integrated into the panel adjacent the second side, and wherein the deactivation and reactivation of the plurality of transmitting and receiving components is performed by a controller that is communicatively coupled to the first sensor, the second sensor, and the plurality of transmitting and receiving components.

14. The method of claim 11, wherein the deactivation and reactivation of the signal transmission over the first frequency range is provided by a controller that is located at a baseband unit coupled to the antenna or that is located within a radome that at least partially encloses the first sensor, the second sensor, and the plurality of transmitting and receiving components.

15. The method of claim 11, further comprising:
buffering data to be transmitted while the signal transmission from the plurality of transmitting and receiving components is deactivated; and
sending the buffered data following the reactivation of the signal transmission from the plurality of transmitting and receiving components.

16. Method of claim 11, wherein the radar emission is detected as it sweeps across the first sensor, the plurality of transmitting and receiving components, and the second sensor.

17. A method of configuring an antenna comprising a plurality of transmitting and receiving components in order to mitigate interference with a radar installation, the method comprising:
attaching a first sensor configured to detect a radar emission to a first side of the antenna;
attaching a second sensor configured to detect the radar emission to a second side of the antenna; and
communicatively coupling a controller to the first sensor, the second sensor, and the plurality of transmitting and receiving components, wherein the controller is configured to:
deactivate signal transmission from the plurality of transmitting and receiving components over a first frequency range when at least one of the first sensor and the second sensor detects the radar emission, and subsequently,
reactivate signal transmission from the plurality of transmitting and receiving components over the first frequency range when the first sensor and the second sensor no longer detect the radar emission.

18. The method of claim 17, wherein the first sensor is attached to the first side of the antenna with a first attachment structure, and wherein the second sensor is attached to the second side of the antenna with a second attachment structure.

19. The method of claim 17, wherein the controller is further configured to:
    buffer data to be transmitted by the antenna while the signal transmission is deactivated; and
    transmit the buffered data using the antenna following the reactivation of the signal transmission.

20. The method of claim 17, wherein the controller is configured to deactivate one or more signal processing components associated with the antenna while the signal transmission is deactivated.

\* \* \* \* \*